United States Patent
Yamaguchi

(10) Patent No.: US 6,487,211 B1
(45) Date of Patent: Nov. 26, 2002

(54) DATA PACKET SWITCHING APPARATUS

(75) Inventor: Tetsuo Yamaguchi, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/521,291

(22) Filed: Mar. 8, 2000

(30) Foreign Application Priority Data

Mar. 18, 1999 (JP) .......................................... 11-073975

(51) Int. Cl.⁷ .......................... H04L 12/28; H04L 12/56
(52) U.S. Cl. ...................... 370/412; 370/416; 370/473; 370/429
(58) Field of Search .............................. 370/412, 352, 370/360, 395.72, 396, 397, 398, 399, 409, 413, 415, 417, 422, 429, 474, 517, 229, 230, 235, 252, 231, 253, 416, 473

(56) References Cited

U.S. PATENT DOCUMENTS

| | | | | |
|---|---|---|---|---|
| 5,335,222 A | * | 8/1994 | Kamoi et al. | 370/390 |
| 5,568,477 A | * | 10/1996 | Galand et al. | 370/395 |
| 5,612,959 A | * | 3/1997 | Takase et al. | 370/230 |
| 5,634,097 A | * | 5/1997 | Ashi et al. | 714/45 |
| 6,049,527 A | * | 4/2000 | Isoyama et al. | 370/235 |
| 6,094,431 A | * | 7/2000 | Yamato et al. | 370/229 |
| 6,137,798 A | * | 10/2000 | Nishihara et al. | 370/392 |
| 6,208,653 B1 | * | 3/2001 | Ogawa et al. | 370/395 |

FOREIGN PATENT DOCUMENTS

JP          9-214501          8/1997

* cited by examiner

*Primary Examiner*—Douglas Olms
*Assistant Examiner*—Phirin Sam
(74) *Attorney, Agent, or Firm*—Katten, Muchin, Zavis, Rosenman

(57) ABSTRACT

In a data packet switching apparatus for switching a data packet, arriving from a plurality of incoming virtual connections in the form of logically multiplexed cells, to a plurality of outgoing virtual connections, efficient use is made of a buffer under congestion. A required data buffer plane quantity monitoring/calculation circuit calculates the number of required data buffer planes (segments) from the packet length contained in the starting cell data, and a packet reception allow/disallow decision/buffer plane quantity securing circuit compares it with the remaining buffer amount. If the number of required buffer planes is larger than the remaining buffer amount, all cell data belonging to the packet are discarded. If the number of required buffer planes is not larger than the remaining buffer amount, the required buffer is presecured by reducing the remaining buffer amount by an amount equivalent to the number of required buffer planes. In a second aspect of the present invention, a unique transmission number is appended to cell data belonging to the packet whose outgoing virtual connection has been determined, the transmission number remaining appended to the cell data until it is transmitted out. The cell data stored in the buffer is output from the buffer for transmission based on the thus determined outgoing virtual connection and the transmission number.

6 Claims, 14 Drawing Sheets

DATA PACKET SWITCHING APPARATUS

BACKGROUND OF THE INVENTION

1. Field of the Invention

The present invention relates to a data packet switching apparatus for switching a data packet such as an IP (Internet Protocol) packet or a frame relay frame between virtual connections and, more particularly, to a data packet switching apparatus for switching a data packet between virtual connections by determining its outgoing virtual connection based on the destination address or other identifier of the data packet arriving in the form of cells from incoming virtual connections, and by changing the virtual connection identifier of each cell from that on the incoming connection to that on the outgoing connection for output.

2. Description of the Related Art

For example, in IP over ATM in which IP packets are transmitted using ATM as an underlying layer, many ATM virtual connections are set up in a mesh-like structure among nodes, and a separate ATM virtual connection is set up between a node and a user.

In a prior art IP packet switching apparatus installed at each such node, IP packets are assembled by storing ATM cells on a connection-by-connection basis as the cells arrive from incoming virtual connections, and the outgoing virtual connection of each packet is determined based on its destination address. When storing cell data in a buffer, if the buffer is full, the data is discarded. Of the packets stored in the buffer, each packet that is assembled, and for which the outgoing virtual connection has been determined, is output from the buffer and converted into cells with the outgoing virtual connection identifier appended to them. After that, an ATM switch forwards the cells onto appropriate connections.

In the prior art configuration described above, if buffer congestion occurs because of an input of bursty traffic, etc. while packets are being assembled at a plurality of input connections, cell discard (due to congestion) occurs at the plurality of connections. Since the packets being assembled are also discarded, the portion of the data buffer used to store the data up to that point in time may be wasted.

Furthermore, the prior art configuration entails a delay dependent on packet length because, after assembling a packet, the packet is reconverted into cells for transmission. As a result, when used in a network where packet switches are connected in multiple stages, the prior art has the problem that the delay time through the network increases and, also, the delay is unpredictable.

SUMMARY OF THE INVENTION

Accordingly, a first object of the present invention is to provide a data packet switching apparatus that achieves efficient utilization of the buffer by minimizing waste under buffer congestion.

A second object of the present invention is to provide a data packet switching apparatus wherein the delay through the apparatus is fixed and is not dependent on packet length and, even when the switches are connected in a multiple stage configuration, the delay is held to a low predictable value.

The first object is accomplished by providing a data packet switching apparatus for switching a data packet, arriving from a plurality of incoming virtual connections in the form of logically multiplexed cells, to a predesignated one of a plurality of outgoing virtual connections, comprising: a required buffer amount calculation circuit for calculating a buffer amount required to store the data packet from a packet length contained in cell data of an incoming cell; a comparator circuit for comparing the required buffer amount with a remaining buffer amount; a data discard circuit for discarding the cell data belonging to the data packet if, as the result of the comparison, the required buffer amount is larger than the remaining buffer amount; a data packet storing and assembling circuit for storing cell data in a buffer for each virtual connection, and for assembling the cell data into a data packet; an outgoing virtual connection resolving section for determining an outgoing virtual connection based on a data packet identifier contained in the cell data; and a packet transmission circuit for transmitting the assembled data packet by appending thereto an identifier of the thus determined outgoing virtual connection.

The second object is accomplished by providing a data packet switching apparatus for switching a data packet, arriving from a plurality of incoming virtual connections in the form of logically multiplexed cells, to a predesignated one of a plurality of outgoing virtual connections, comprising: a data packet assembling circuit for storing cell data of incoming cells in a buffer for each virtual connection; an outgoing virtual connection resolving section for determining an outgoing virtual connection based on a data packet identifier contained in the cell data; a transmission identification number management circuit for appending one unused transmission identification number, selected from among a plurality of different transmission identification numbers, to the cell data belonging to the data packet for which the outgoing virtual connection has been determined, the transmission identification number remaining appended to the cell data until the transmission of the cell data is completed; and a packet transmission circuit for transmitting the data packet assembled for each outgoing virtual connection by taking the cell data out of the buffer for transmission based on the determined outgoing virtual connection and the appended transmission identification number.

DESCRIPTION OF THE PREFERRED EMBODIMENTS

Figure 1:
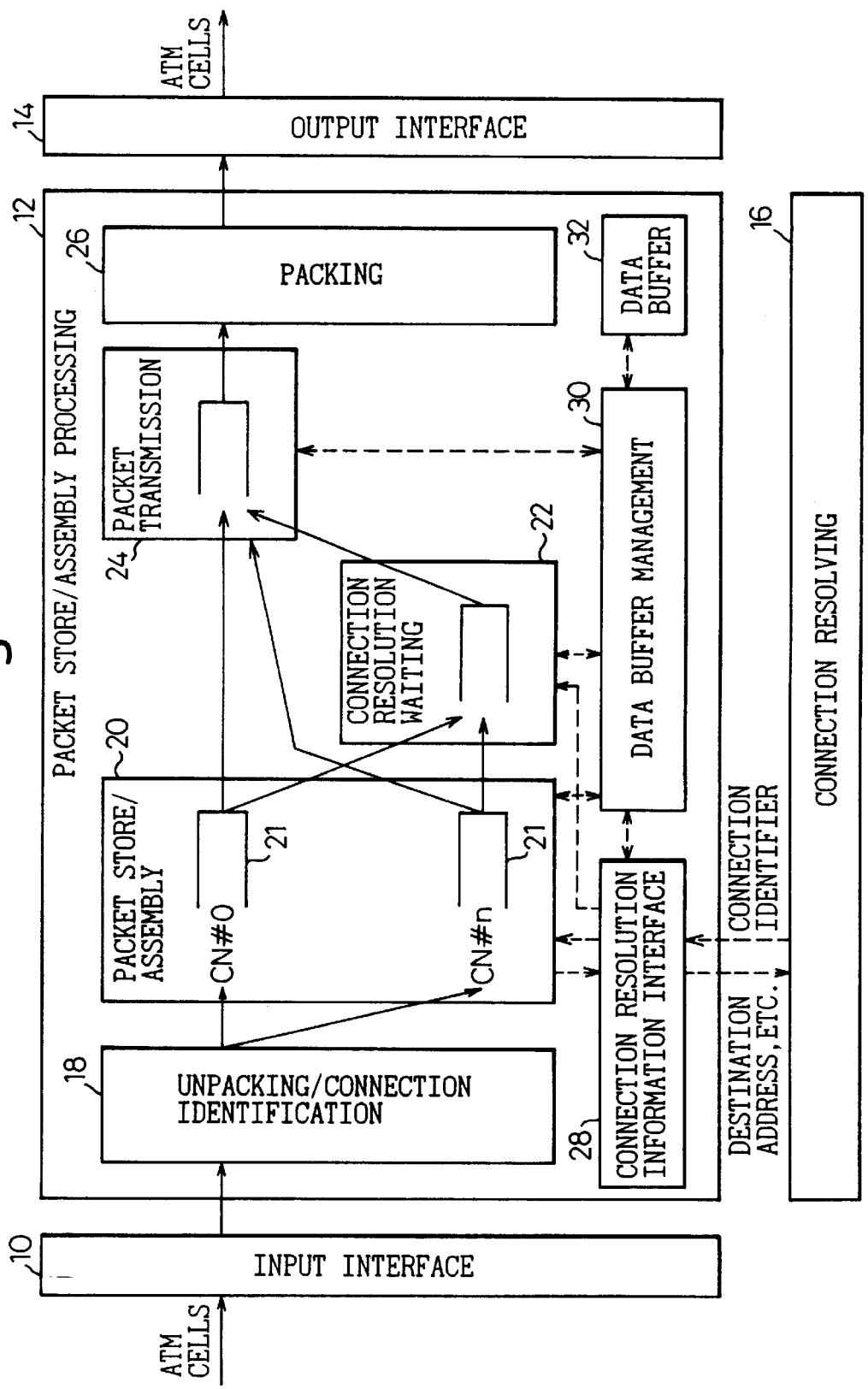
FIG. 1 is a block diagram showing one example of a prior art data packet switching apparatus.

Before describing the present invention, a prior art data packet switching apparatus will be described first with reference to drawing. FIG. 1 shows one example of the prior art data packet switching apparatus.

The data packet switching apparatus shown in FIG. 1 comprises an input interface 10, a packet store/assembly processing section 12, an output interface 14, and a connection resolving section 16. The packet store/assembly processing section 12 includes a unpacking/connection identification circuit 18, a packet store/assembly circuit 20, a connection resolution waiting circuit 22, a packet transmission circuit 24, a packing circuit 26, a connection resolution information interface 28, a data buffer management circuit 30, and a data buffer 32.

The input interface 10 receives ATM cells from the line.

The unpacking/connection identification circuit 18 unpacks the ATM cells input via the input interface 10 in accordance with ATM adaptation layer Type 5, and appends input identification information to the unpacked segment data (cell data), based on the virtual connection identifier contained in the ATM cell header.

When an empty data buffer is allocated by the data buffer management circuit 30 (described later), the packet store/assembly circuit 20 assembles a packet (ATM adaptation layer PDU) by storing the segment data in the data buffer 32 for each input connection in accordance with the input identification information appended to the segment data; however, if an empty data buffer is not allocated, the segment data is not stored but is discarded. When the assembling of the packet is completed, if output identification information for that packet has already been received from the connection resolving section 16 (described later), that information is sent to the packet transmission circuit 24 (described later) together with the packet information; if the output identification information for that packet has not been received yet, the packet information is sent to the outgoing connection resolution waiting circuit 22 (described later) to hold the packet until the outgoing connection is resolved.

In order to resolve the outgoing ATM virtual connection for the stored packet, the connection resolution information interface 28 transfers the destination address or other control information such as a link identifier carried in the packet header and the result of the resolution (output identification information) to and from the connection resolving section 16 (described later).

The connection resolution waiting circuit 22 holds the assembled packet information until the outgoing connection is resolved and, after the connection is resolved, sends the packet information to the packet transmission circuit 24 (described later) together with the output identification information received from the connection resolving section 16 (described later).

To effect packet-by-packet transmission of data packets that have been assembled and whose outgoing ATM connections have been resolved, the packet transmission circuit 24 places these data packets into a transmission queue for transmission and, after transmission, releases the data buffer to the data buffer management circuit 30 (described later).

The transmitted data packet is reconverted into cells by the packing circuit 26 in accordance with ATM adaptation layer Type 5 and transmitted.

The data buffer management circuit 30 manages the availability/usage status of the data buffer 32 of a common buffer type and allocates an empty data buffer to the packet store/assembly circuit 20; when a data buffer is released by the packet transmission circuit 24 after data transmission, the data buffer is again managed as an empty data buffer.

The connection resolving section 16 resolves (obtains) the outgoing ATM virtual connection identifier based on the destination address or other control information, such as a link identifier, received from the packet store/assembly processing section 12, and reports the result of the resolution to the packet store/assembly processing section 12.

The output interface 14 sends out the ATM cells, output from the packet store/assembly processing section 12, onto the outgoing line.

The operation of the above prior art data packet switching apparatus will be described. A data packet logically multiplexed into ATM cells, arriving from a plurality of ATM virtual connections, is unpacked by the unpacking/connection identification circuit 18, and transferred to the packet store/assembly circuit 20 at the next stage after appending input identification information such as an incoming ATM virtual connection identifier and the cell position (beginning, middle, or end) in the packet.

The packet store/assembly circuit 20 stores cell data in an empty segment of the data buffer 32 in cooperation with the data buffer management circuit 30. At the same time, if the cell data is identified as data corresponding to the packet header (the first cell) from the input identification information appended to it, the state of the corresponding input connection is updated (from idle to assembly in progress), and the information (address, etc.) of the buffer segment currently used, as the data buffer start and end pointers, and an initial value "1", as the count of the number of received data segments, are entered into a packet assembly management table 21 provided for each input connection. Further, the destination address and other information carried in the predetermined position of the cell data (the packet header) is passed to the connection resolving section 16 via the connection resolution information interface circuit 28.

On the other hand, after reporting the empty data buffer segment information (buffer allocation) to the packet store/assembly circuit 20, the data buffer management circuit 30 removes the allocated buffer segment from the empty buffer management information. If there is no empty data buffer segment available at this time (due to buffer congestion), the data is discarded because an empty data buffer cannot be allocated to the packet store/assembly circuit 20.

The connection resolving section 16 searches a translation (resolution) table using the destination address or other received information, resolves the outgoing ATM virtual connection identifier, and reports the result of the resolution to the connection resolution information interface 28. Based on the received information, the outgoing connection resolution information interface 28 updates the control area of the corresponding data buffer 32 (sets the state to the resolved state).

Next, if the cell data received from the unpacking/connection identification circuit 18 corresponds to a middle cell, the packet store/assembly circuit 20 stores the data in the empty data buffer segment allocated by the data buffer management circuit 30, as in the case of the first cell. At the same time, the information of the currently allocated buffer segment is registered as the data buffer end pointer in the packet assembly management table 21 for the corresponding input connection, and the connection buffer segment within the control area of the previous buffer segment is rewritten to indicate the currently allocated one. Further, the count of the number of received data segments in the packet assembly management table 21 is incremented by one (+1). If there is no empty data buffer segment available at this time, the data is discarded, as in the case of the first cell.

Finally, if the cell data received from the unpacking/connection identification circuit 18 corresponds to the final cell, the packet store/assembly circuit 20 stores the data in the empty data buffer segment allocated by the data buffer management circuit 30, as in the case of the previous cell. At the same time, the state of the input connection is updated (from assembly in progress to idle), the information of the currently allocated buffer segment is registered as the data buffer end pointer in the packet assembly management table 21, and the connection buffer segment within the control area of the previous buffer segment is rewritten to indicate the currently allocated one. Further, the count of the number of received data segments in the packet assembly management table 21 is incremented by one (+1), as in the case of the middle cell. At the same time, the information of the packet assembly management table 21 is copied to the control area of the data buffer segment 32 indicated by the start pointer. If there is no empty data buffer segment available at this time, the data is discarded in the packet store/assembly circuit 20. Furthermore, if, at this time, the outgoing connection state indicated in the control area of the first data buffer 32 is the resolved state, its start pointer information is reported to the packet transmission circuit 24; if the outgoing connection is not resolved yet, the data buffer start pointer information is reported to the outgoing connection resolution waiting circuit 22. The outgoing connection resolution waiting circuit 22 monitors the control area of the data buffer 32 at periodic intervals and, when the connection state changes to the resolved state, reports its start pointer information to the packet transmission circuit 24.

The packet transmission circuit 24 queues the data buffer start pointer of the transmission data packet received from the packet store/assembly circuit 20 or the connection resolution waiting circuit 22, and outputs data on a packet-by-packet basis in accordance with the queuing information and the connection information in each data buffer segment. As each data buffer segment is exhausted of data, the data buffer management circuit 30 is notified accordingly (the buffer segment is released), and the released buffer segment is again registered in the empty buffer segment table.

The data packet output from the packet transmission circuit 24 is converted into cells by the packing circuit 26 in accordance with ATM adapter layer Type 5, and transmitted out. At this time, each cell is transmitted out with an ATM virtual connection identifier appended to it according to the appended output identification information, and switched to the appropriate path by an ATM switch (not shown) provided at the subsequent stage.

With the above series of operations, data packets logically multiplexed into ATM cells, arriving from a plurality of ATM virtual connections, are stored (assembled) by aggregating the plurality of connections, and each packet is reconverted into ATM cells for transmission onto the outgoing ATM virtual connection determined based on the destination address, etc. carried in the packet header.

In the prior art configuration, each time an input data packet logically multiplexed on a plurality of ATM virtual connections is received as an ATM cell, only one segment is allocated to that cell data from the empty data buffer; that is, a buffer exclusive for that packet is not provided. The resulting problem is that, if buffer congestion occurs, packet discard occurs for a plurality of packets being assembled due to the unavailability of an empty buffer, thus wasting the data buffer used to store the data up to that point in time.

Furthermore, according to the prior art configuration, since each packet is not transmitted out until after it is assembled, the delay through the switching apparatus is dependent on the packet length. Accordingly, when the switches are connected in a multiple stage configuration, there arises the problem that the delay time becomes unpredictable because the delay time error becomes excessively large with an increasing number of stages.

Figure 2:
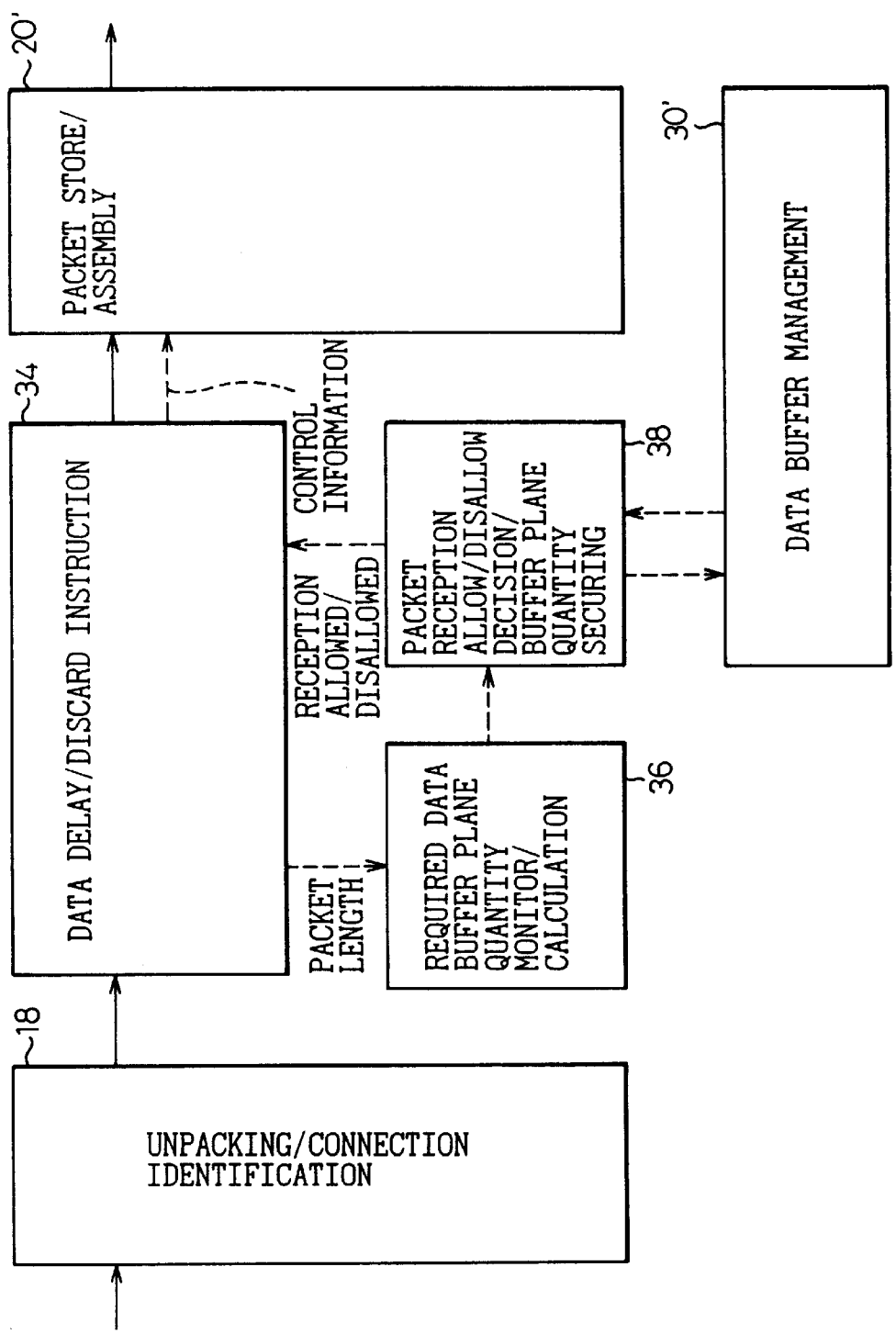
FIG. 2 is a block diagram showing a portion of a data packet switching apparatus according to a first embodiment of the present invention.

FIG. 2 shows a portion of a data packet switching apparatus according to a first embodiment of the present invention. The same constituent elements as those shown in FIG. 1 are designated by the same reference numerals, and modified constituent elements are designated by the same reference numerals followed by "'".

As shown in FIG. 2, in the first embodiment of the invention, a data delay/discard instruction circuit 34, a required data buffer plane quantity monitoring/calculation circuit 36, and a packet reception allow/disallow decision/buffer plane quantity securing circuit 38 are provided between the unpacking/connection identification circuit 18, packet store/assembly circuit 20', and data buffer management circuit 30'. Other constituent elements shown in FIG. 1 are not shown here.

The required data buffer plane quantity monitoring/calculation circuit 36 monitors the packet length indicated in the header of an input packet, and calculates from the packet length the total number of data buffers (segments) required to assemble the packet.

The packet reception allow/disallow decision/buffer plane quantity securing circuit 38 makes a decision on whether the reception of the packet is to be allowed or disallowed by comparing the result of the calculation (the total number of required data buffers) reported by the circuit 36 with the number of data buffer planes remaining in the data buffer, and collectively secures data buffer planes equivalent to the total number of required data buffers.

The data delay/discard instruction circuit 34 delays the data so that the data is not stored in the data buffer while the required buffer plane quantity calculation and buffer plane securing process is in progress, and instructs the packet store/assembly circuit 20' to store the data in the buffer when the reception is allowed, but to discard that data and all subsequent data belonging to the same packet when the reception is disallowed.

Figure 3:
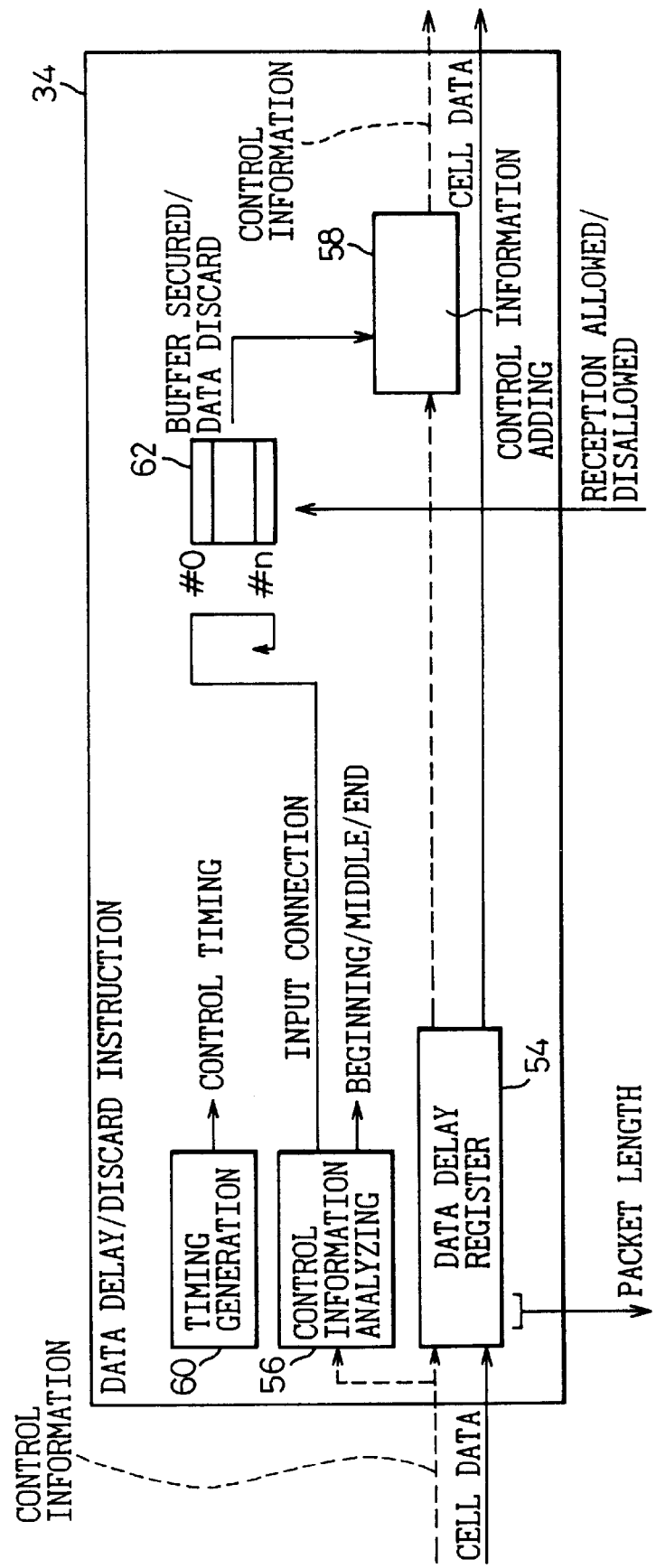
FIG. 3 is a block diagram showing the detailed configuration of a data delay/discard instruction circuit in FIG. 2.
Figure 4:
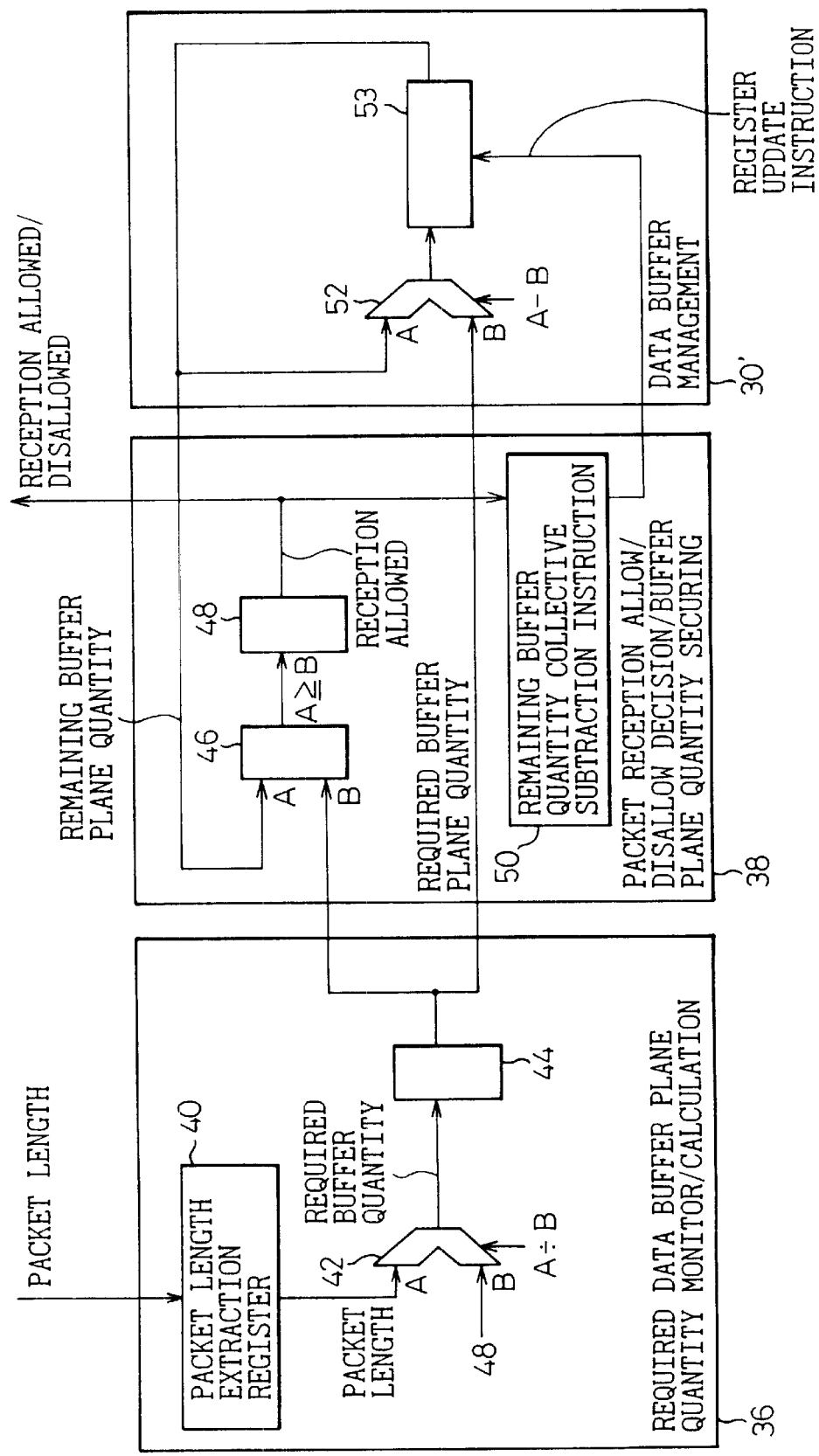
FIG. 4 is a block diagram showing the detailed configuration of a required data buffer plane quantity monitoring/calculation circuit, a packet reception allow/disallow decision/buffer plane quantity securing circuit, and a data buffer management circuit in FIG. 2.

FIG. 3 shows the detailed configuration of the data delay/discard instruction circuit 34. FIG. 4 shows the detailed configuration of the required data buffer plane quantity monitoring/calculation circuit 36, the packet reception allow/disallow decision/buffer plane quantity securing circuit 38, and the data buffer management circuit 30'. FIG.

Figure 5:
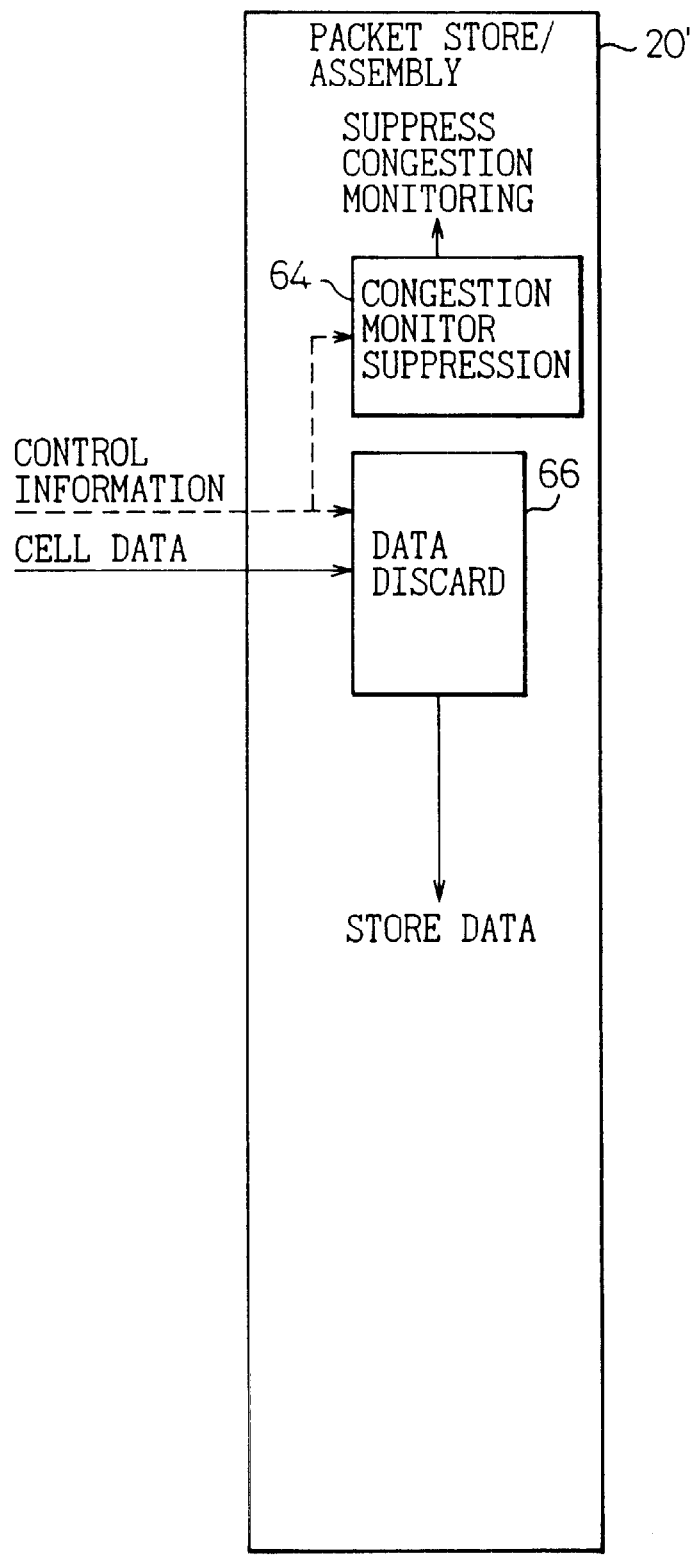
FIG. 5 is a block diagram showing the detailed configuration of a packet store/assembly circuit in FIG. 2.

5 shows the detailed configuration of the packet store/assembly circuit 20'. For the data buffer management circuit 30' and the packet store/assembly circuit 20', the details of the portions added according to the present invention are shown. Referring to FIGS. 3 to 5, the first embodiment of the present invention will be described in detail below.

The required data buffer plane quantity monitoring/calculation circuit 36 in FIG. 4 includes a packet length extraction register 40, a required buffer plane quantity computing circuit 42, and a required buffer plane quantity holding register 44. The packet reception allow/disallow decision/buffer plane quantity securing circuit 38 includes a comparator circuit 46, a reception allow/disallow decision flag 48, and a remaining buffer quantity collective subtraction instruction circuit 50. The data buffer management circuit 30' contains a remaining buffer quantity computing circuit 52.

The data delay/discard instruction circuit 34 of FIG. 3 includes a data delay register 54, a control information analyzing circuit 56, a control information adding circuit 58, a timing generation circuit 60, and a packet discard instruction table 62.

The packet store/assembly circuit 20', of FIG. 5 contains a congestion monitor suppression circuit 64 and a data discard circuit 66.

A data packet logically multiplexed into ATM cells, arriving from a plurality of ATM virtual connections, is unpacked by the unpacking/connection identification circuit 18, and transferred to the data delay/discard instruction circuit 34 (FIG. 3) after appending input identification information such as an incoming ATM virtual connection identifier and the cell position (beginning, middle, or end) in the packet. The input identification information will hereinafter be referred to as the control information.

When ATM cell data is input, the data delay/discard instruction circuit 34 temporarily stores the ATM cell data and its control information in the data delay register 54 to provide a prescribed processing time before the data is stored in the buffer. The timing generation circuit 60 distributes timing signals to the various circuits.

At the same time, if the result of analyzing the control information by the control information analyzing circuit 56 shows that the cell data is data corresponding to the packet header (the first cell), the packet length data carried in the designated position in the header (in the case of an IP packet, the packet length data is contained in the IP header) is taken into the packet length extraction register 40 in the required data buffer plane quantity monitoring/calculation circuit 36 in FIG. 4. In the required data buffer plane quantity monitoring/calculation circuit 36, the required buffer plane quantity computing circuit 42 computes the number of required buffer planes (segments) by dividing the packet length value by 48 bytes (the payload length of the cell), and reports the resultant value to the associated circuits. In the data buffer, one cell data corresponds to one buffer segment.

In the packet reception allow/disallow decision/buffer plane quantity securing circuit 38, the comparator circuit 46 compares the result of the computation (the number of required buffer planes) with the value of a remaining buffer plane quantity indicating register 53 (indicating the number of remaining buffer planes) in the data buffer management circuit 30'. If the number of required buffer planes is not larger than the number of remaining buffer planes, it is determined that packet reception is possible. At this time, under the control of the remaining buffer quantity collective subtraction instruction circuit 50, the number of required buffer planes is collectively subtracted by updating the contents of the remaining buffer plane quantity indicating register 53 using the output of the remaining buffer quantity computing circuit 52, thereby securing the necessary data buffer for the packet. The number of remaining buffer planes is reduced in advance in this manner, in order to prevent the data buffer congestion monitoring and judging operations from being influenced by other packet data when the cell data is input to the packet store/assembly circuit 20'. At the same time, the packet reception allow/disallow decision/buffer plane quantity securing circuit 38 sends a "reception allowed" notification to the data delay/discard instruction circuit 34. On the other hand, if the number of required buffer planes is larger than the number of remaining buffer planes, it is determined that packet reception is not possible, and a "reception disallowed" notification is sent to the data delay/discard instruction circuit 34.

Based on the notification from the packet reception allow/disallow decision/buffer plane quantity securing circuit 38, the data delay/discard instruction circuit 34 (FIG. 3) updates the packet discard instruction table 62 at a prescribed timing. The packet discard instruction table 62 thus stores the status for each input connection as to whether the necessary buffer has been secured and the reception is possible or the reception is not possible and the packet should be discarded. Based on the information carried in the packet discard instruction table, the control information adding circuit 58 transfers each cell data to the next stage (the packet store/assembly circuit 20') by appending (adding) to the control information of the cell data the information indicating that the buffer has been secured or that the data should be discarded.

Here, in the case of the prior art, each time cell data is input, the packet store/assembly circuit 20 allocates an empty buffer and monitors the status of the buffer (congestion) in cooperation with the data buffer management circuit 30.

In contrast, in the present invention, in order to presecure the necessary data buffer for each packet, if the reception of succeeding cell data is possible, the value of the remaining buffer plane quantity indicating register 53 in the data buffer management circuit 30' is reduced in advance by a value equivalent to the number of required buffer planes. This might cause a contradiction in the status if the congestion monitoring were performed in the same manner as in the prior art.

To address this, the congestion monitor suppression circuit 64 monitors the control information supplied from the data delay/discard instruction circuit 34 and, if the control information indicates "necessary buffer secured", the congestion judgement for that cell data is not performed. The processing from the data storing operation onward is the same as that in the prior art described earlier.

If the control information indicates "data discard", the input cell data is not stored in the data buffer, but is discarded by the data discard circuit 66.

If the ATM cell data input to the data delay/discard instruction circuit 34 is data other than the first cell, the information registered in the packet discard instruction table 62 when the first cell was processed is added, in accordance with the connection of the input cell data, to the control information of the cell data to be transferred to the packet store/assembly circuit 20'. Since the information in the packet discard instruction table 62 is updated only when the first cell of a packet is input, once it is determined that the first cell is to be discarded, all succeeding data belonging to the same packet are discarded, thus discarding data on a packet-by-packet basis.

As described above, when the first segment of the packet is received, as many data buffer planes as are required to assemble the packet are secured in advance from an empty buffer; as a result, packet discard due to buffer congestion will not occur during the assembling of the packet. This ensures efficient utilization of the buffer.

Figure 6:
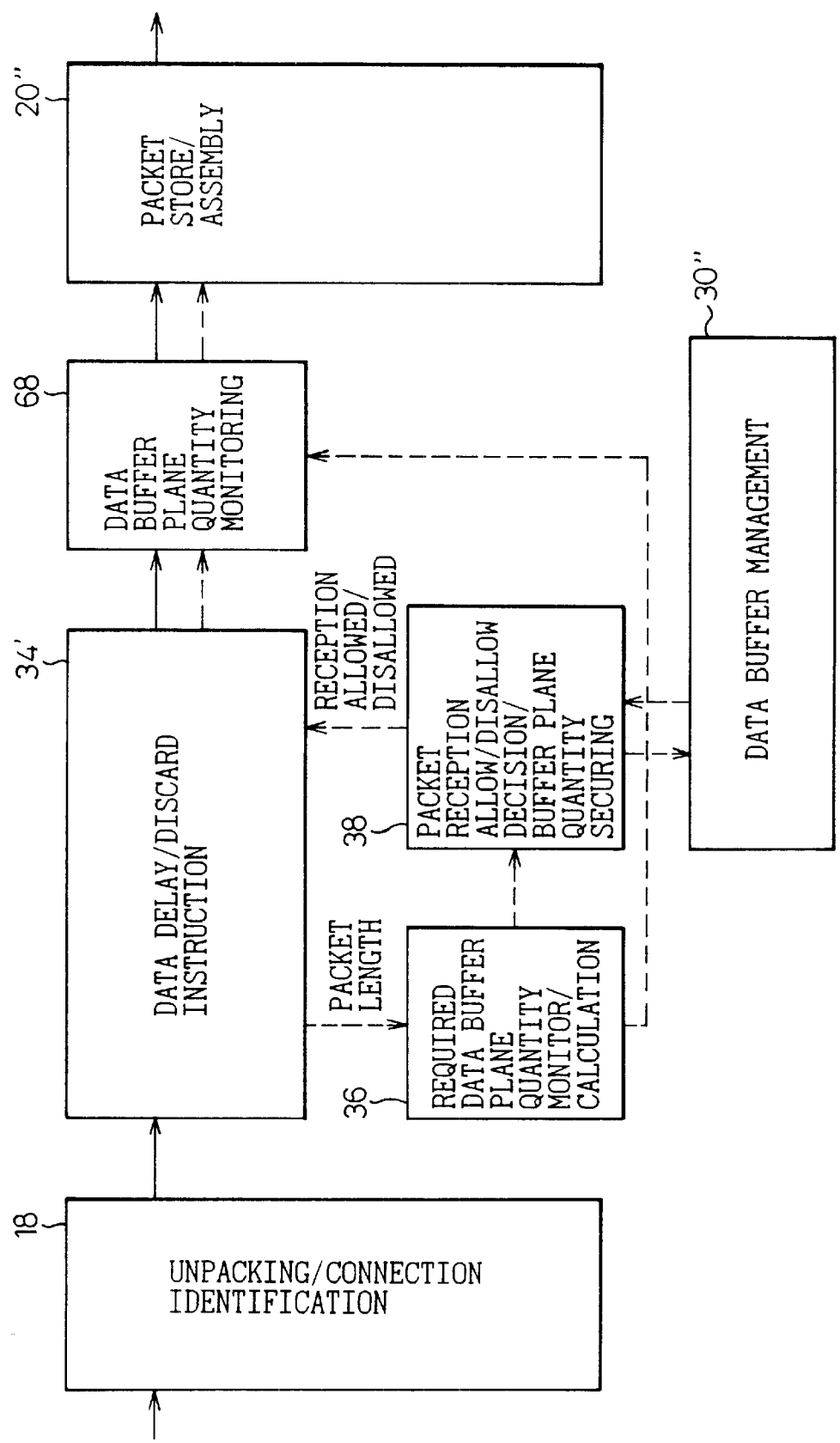
FIG. 6 is a block diagram showing one modification of the data packet switching apparatus of FIG. 2.

FIG. 6 shows one modification of the first embodiment according to the present invention. The same constituent elements as those in FIG. 2 are designated by the same reference numerals. The data delay/discard instruction circuit 34, the data buffer management circuit 30', and the packet store/assembly circuit 20' are now designated by reference numerals 34', 30", and 20", respectively, and a data buffer plane quantity monitoring circuit 68 is newly added. This newly added data buffer plane quantity monitoring circuit 68 monitors the length of the packet actually being input by comparing the packet length with the number of presecured data buffer planes and, if the former exceeds the latter, stops storing the packet data and releases the data buffer being used to store the packet up to that point in time, thereby preventing malfunctioning due to an illegal packet whose packet length is longer than the packet length indicated in the packet.

Figure 7:
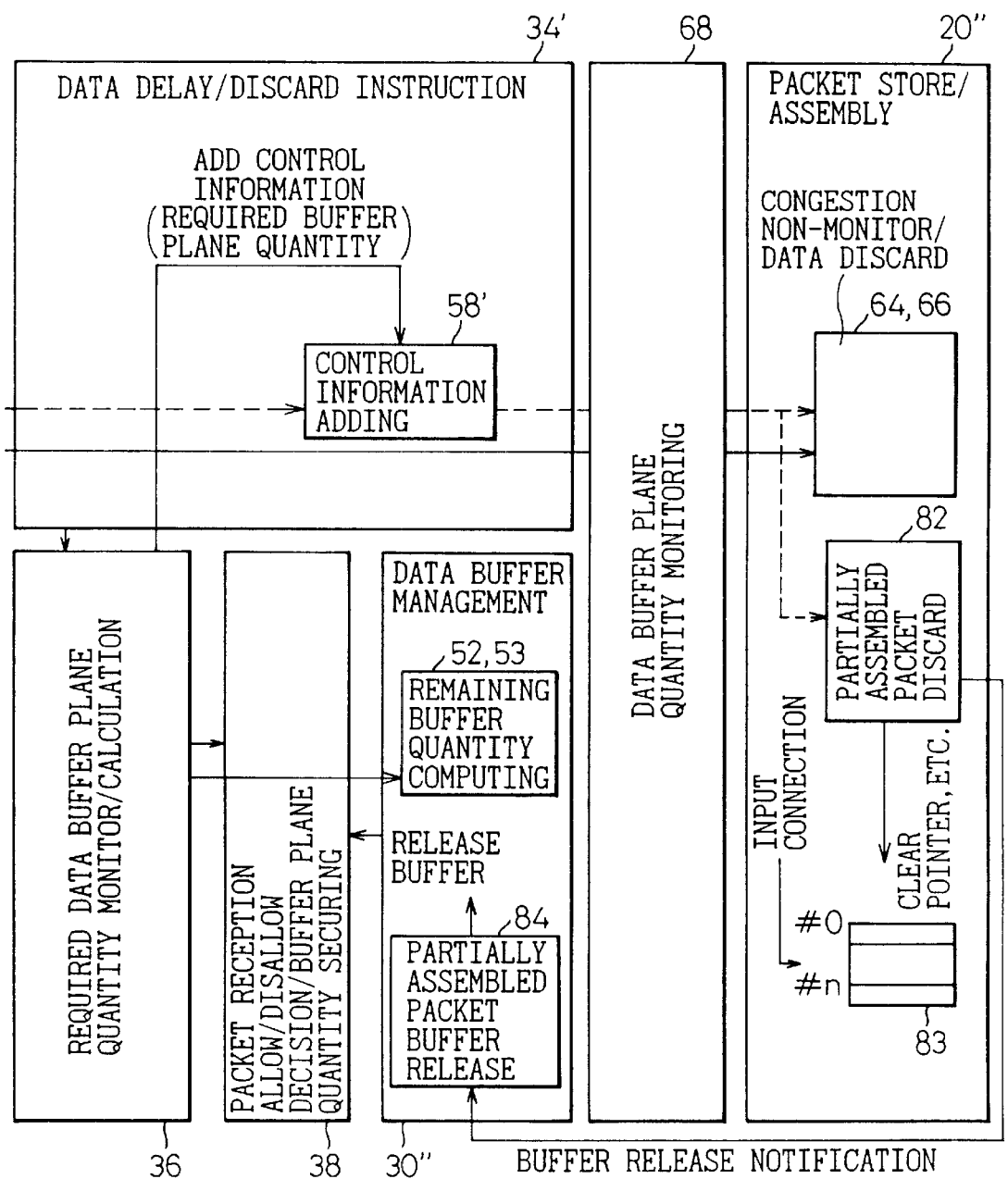
FIG. 7 is a block diagram showing the detailed configuration of a data delay/discard instruction circuit, a data buffer management circuit, and a packet store/assembly circuit in FIG. 6.
Figure 8:
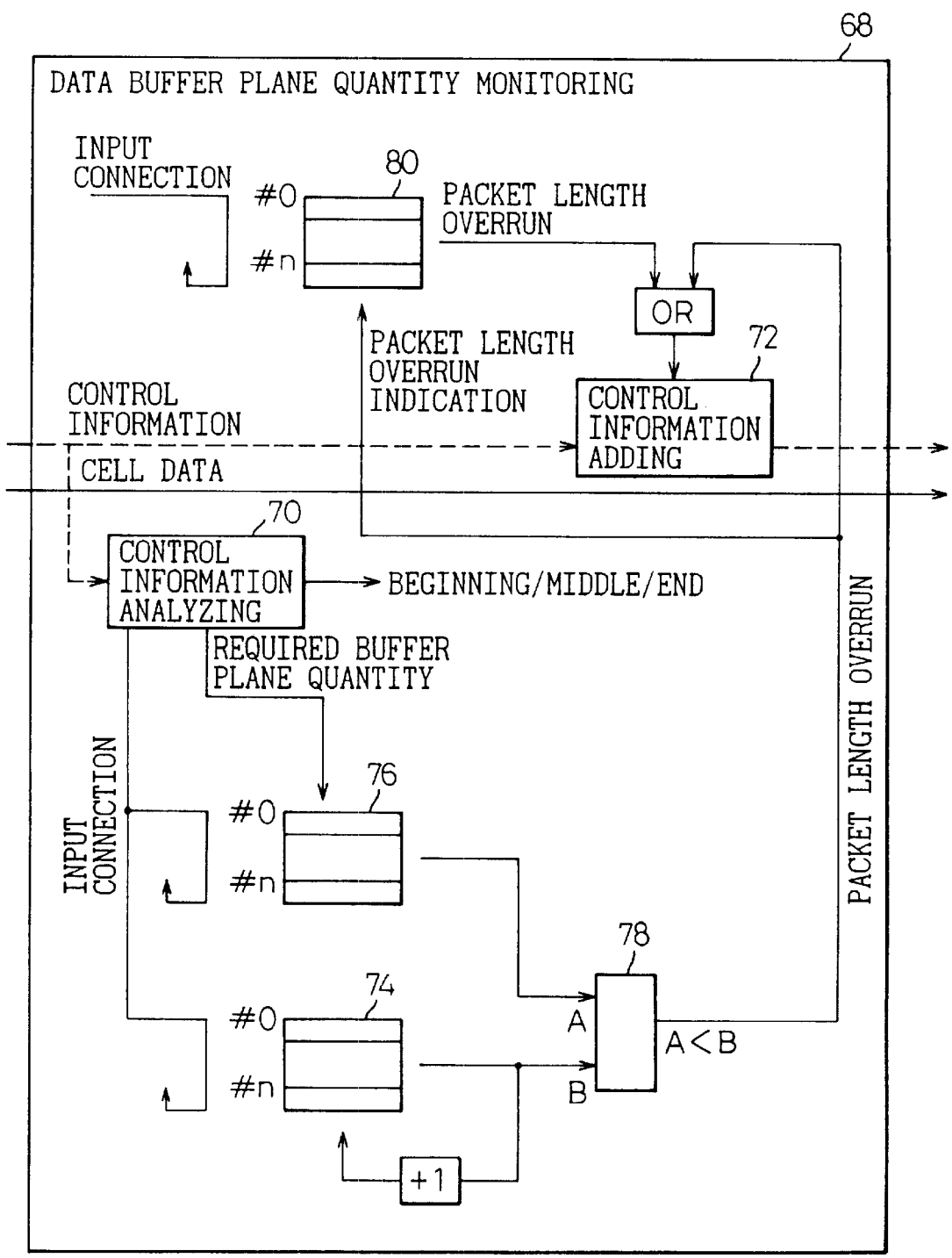
FIG. 8 is a block diagram showing the detailed configuration of a data buffer plane quantity monitoring circuit in FIG. 6.

FIG. 7 shows the detailed configuration of the data delay/discard instruction circuit 34', the data buffer management circuit 30", and the packet store/assembly circuit 20", and FIG. 8 shows the detailed configuration of the data buffer plane quantity monitoring circuit 68.

The data buffer plane quantity monitoring circuit 68 includes a control information analyzing circuit 70, a control information adding circuit 72, a received data segment counter table 74, a required buffer plane quantity holding table 76, a comparator circuit 78, and a received packet length overrun management table 80.

The control information adding circuit 58' (FIG. 7) in the data delay/discard instruction circuit 34' is equipped with an additional function. The packet store/assembly circuit 20" additionally includes a partially assembled packet discard circuit 82 and, in the data buffer management circuit 30", a packet assembling buffer releasing circuit 84 is newly added.

As in the previously described operation, when ATM cell data is input, the data delay/discard instruction circuit 34', cooperating with the required data buffer plane quantity monitoring/calculation circuit 36 and the packet reception allow/disallow decision/buffer plane quantity securing circuit 38, transfers the cell data and its control information (buffer secured/packet discard, etc.) to the data buffer plane quantity monitoring circuit 68.

At this time, in the data delay/discard instruction circuit 34', if the input cell data is data corresponding to the packet header (the first cell), the control information adding circuit 58' appends, to the control information, the number of required buffer planes reported from the required data buffer plane quantity monitoring/calculation circuit 36 as well as the information previously described, and sends the control information together with the cell data to the data buffer plane quantity monitoring circuit 68 at the next stage at prescribed timing.

The above operation is not performed if the input cell data is data other than the first cell.

When the cell data and its control information are input, the data buffer plane quantity monitoring circuit 68 transfers them to the packet store/assembly circuit 20" at the next stage. At the same time, the control information analyzing circuit 70 analyzes the control information and, if the cell data is packet header (the first cell), writes the number of required buffer planes appended to the control information to the position of the corresponding input connection in the required buffer plane quantity holding table 76. Further, the corresponding positions in the received data segment counter table 74 and the received packet length overrun management table 80 are cleared to "0".

If the input cell data is data other than the first cell data, the value in the received data segment counter table 74 for the corresponding input connection is incremented by one (+1) for each input of data, and the value is compared by the comparator circuit 78 with the number of required buffer planes stored in the required buffer plane quantity holding table 76 for that input connection. If the former (the value of the received data segment counter) exceeds the latter (the number of required buffer planes), a "received packet length overrun condition" is written to the position of the corresponding input connection in the received packet length overrun management table 80. At the same time, the control information adding circuit 72 adds, in addition to the "data discard" instruction, a "partially assembled packet discard" instruction and the "corresponding input connection identifier" to the control information (rewrites the control information), and sends the control information to the next stage. Here, unless the result of the comparison shows the overrun condition, the control information adding circuit 72 does nothing but just lets the control information be passed unaltered to the next stage. Further, when the control information (cell data) is input, if the value in the received packet length overrun management table 80 for the corresponding input connection indicates the "received packet length overrun" condition, the control information adding circuit 72 adds the "data discard" instruction, the "partially assembled packet discard" instruction, and the "corresponding input connection identifier" to the control information for transfer to the next stage, as in the above case. For all succeeding cell data (arriving after the occurrence of the received packet overrun), the "data discard" instruction, the "partially assembled packet discard" instruction, and the "corresponding input connection identifier" are added to the control information for transfer to the packet store/assembly circuit 20" at the next stage, until the first cell (of a new packet) arrives. In the packet store/assembly circuit 20" (FIG. 7), if the "data discard" instruction is contained in the input control information, the data is not stored, but discarded, as previously described.

Accordingly, even if data with a received packet length overrun condition continues to arrive thereafter, since the "data discard" instruction is carried in its control signal, the data is not stored in the data buffer, but is discarded.

Further, when the "partially assembled packet discard" instruction and the "corresponding input connection identifier" are contained in the control information, if the input connection status registered in the packet assembly management table 83 for the corresponding input connection is "packet assembly in progress", the partially assembled packet discard circuit 82 removes (clears) the start pointer and end pointer registered therein to indicate the start and end of the packet being assembled (data buffer array), and notifies the data buffer management circuit 30" that the data buffer array is now available as an empty buffer array. At the same time, the input connection state, as other management information, is updated (from assembly in progress to idle state). If data with a received packet length overrun condition continues to arrive thereafter, the packet assembly management table 83 is not updated.

In the data buffer management circuit 30", the packet assembling buffer releasing circuit 84 reconstructs the empty buffer array by connecting the start pointer of the reported data buffer array to the end pointer of the empty buffer management information.

Since the data buffer array used for the assembling of the packet is thus made available as an empty buffer, this is equivalent to discarding the packet in its entirety during the assembling.

With the above operation, the number of data buffer planes being actually used for storing data is prevented from exceeding the number of presecured data buffer planes. Specifically, since the packet length indicated in the packet header (for example, IP packet) is open to users as a user interface, the above configuration serves to prevent the switching apparatus from malfunctioning when the packet length is erroneously set shorter by the user (or in the event of a failure).

The data packet switching apparatus of the invention described above achieves efficient utilization of the buffer by presecuring necessary buffer segments for a packet carrying packet length data in its header, but in the case of a packet, such as a frame relay frame, that does not carry packet length data in its header, it is only possible to control buffer congestion on a cell-by-cell basis, as in the prior art. However, if provisions are made to append packet length data at the head of a packet at the entrance to a network (for example, at a user node interface (UNI) to which a user connects) and remove the packet length data at the exit from the network (for example, at a UNI connecting to a user), a substantial portion of buffer congestion control can be performed efficiently. It is possible to know in advance what virtual connections are connections from which packets that do not contain packet length data are input, and what virtual connections are connections on which packets that do not contain packet length data should be sent out.

Figure 9:
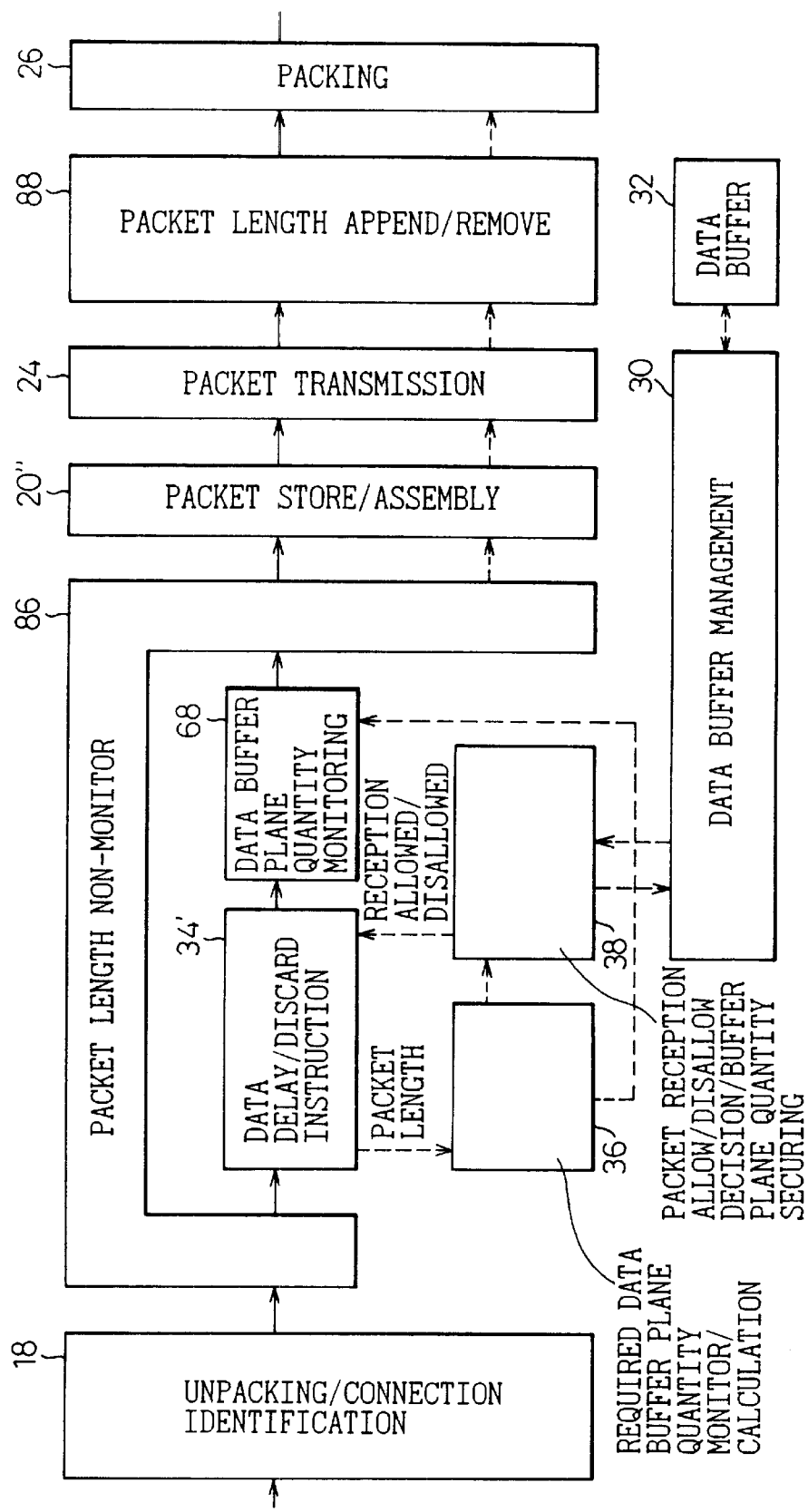
FIG. 9 is a block diagram showing another modification of the data packet switching apparatus of FIG. 2.

FIG. 9 shows a second modification of the first embodiment of the present invention based on the above concept. A bypass circuit 86 bypasses the processing for securing a buffer based on the packet length contained in cell data or processing for discarding cell data before it is stored, to thereby perform cell-by-cell buffer congestion control for a designated ATM virtual connection. A packet length appending/removing circuit 88 appends packet length data at the head of a packet for a designated ATM connection or removes the appended packet length data for another designated ATM connection. Here, the provision of the packet length non-monitor circuit 86 is not an essential requirement, but since a virtual connection from which a packet with no packet length data is input is known in advance, it is desirable to provide this circuit in order to prevent malfunctioning due to an illegal packet.

Figure 10:
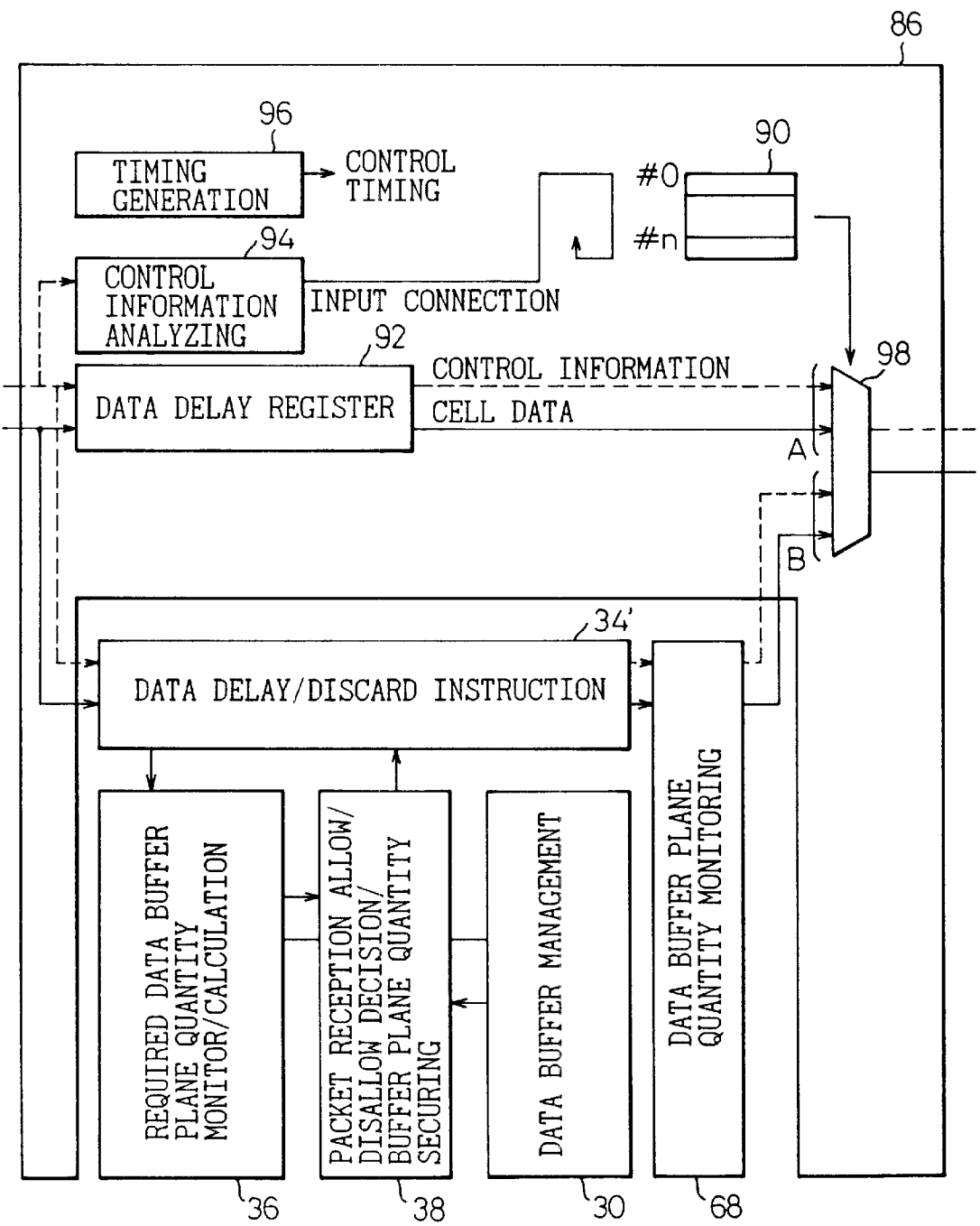
FIG. 10 is a block diagram showing the detailed configuration of a bypass circuit in FIG. 9.

FIG. 10 shows the detailed configuration of the bypass circuit 86. The bypass circuit 86 includes a bypass designation table 90, a data delay register 92, a control information analyzing circuit 94, a timing generation circuit 96, and a selector 90.

When cell data is input from the unpacking/connection identification circuit 18 to the bypass circuit 86, the control information analyzing circuit 94 in the bypass circuit 86 analyzes the input connection and, using the analyzed input connection, searches the bypass designation table 90 where monitor/bypass information is preset for each connection. If the input connection is a packet length monitor connection, the timing generation circuit 96 generates control timing to secure the time necessary for the processing to be performed in the data delay/discard instruction circuit 34', the required data buffer plane quantity monitoring/calculation circuit 36, the packet reception allow/disallow decision/buffer plane quantity securing circuit 38, and the data buffer plane quantity monitoring circuit 68. The selector 98 selects the control information and the cell data input from the data delay/discard instruction circuit 34', if the data buffer plane quantity monitoring circuit 68 is not provided, or the control information and the cell data input from the data buffer plane quantity monitoring circuit 68, if it is provided, and transfers them to the packet store/assembly circuit 20".

On the other hand, if the result of the search of the bypass designation table 90 shows that the input connection is a bypass connection, the control information and the cell data input from the unpacking/connection identification circuit 18 are delayed through the data delay register 92 by an amount of time equal to the amount of time that would be secured in the case of a packet length monitor connection, and the cell data and control information thus delayed are selected by the selector 98 for input to the packet store/assembly circuit 20". The data delay register 92 here is included to ensure phase timing coincidence between both data outputs.

In this way, the processing for securing a buffer based on packet length and the processing for discarding cell data are suppressed for a designated input connection.

Figure 11:
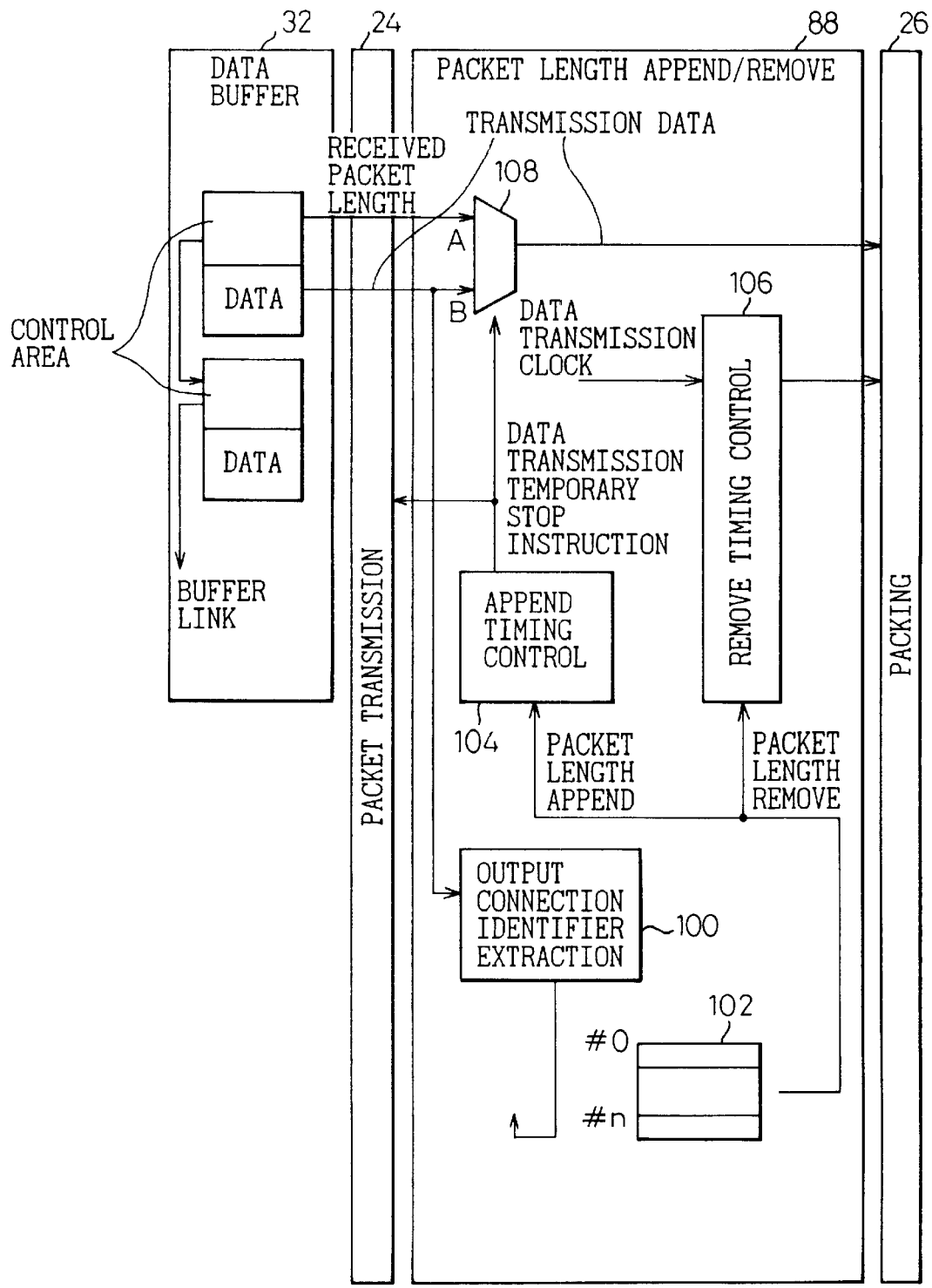
FIG. 11 is a block diagram showing the detailed configuration of a packet length appending/removing circuit in FIG. 9.

FIG. 11 shows the detailed configuration of the packet length appending/removing circuit 88. The packet length appending/removing circuit 88 includes an output connection identifier extraction circuit 100, a packet length appending/removing table 102, an append timing control circuit 104, a remove timing control circuit 106, and a selector 108.

For the data packet output from the packet transmission circuit 24, the output connection identifier extraction circuit 100 in the packet length appending/removing circuit 88 obtains the output connection, based on which the entry preset in the packet length appending/removing table 102 for the output connection is examined. If "packet length append" instruction information is preset at that entry, the append timing control circuit 104 temporarily stops the data packet output from the packet transmission circuit 24, during which time the selector 108 selects for output the received packet count indicated in the buffer control area reserved for that data packet.

On the other hand, if the result of the search shows that "packet length remove" instruction information is preset, the remove timing control circuit 106 stops the supply of the data transmission clock to the packing circuit 26 for the duration of time necessary to remove the packet length data, thus allowing the appended packet length data to be removed.

With the above series of operations, in the case of a protocol type (for example, frame relay) that does not carry packet length data in the packet header as a UNI packet format, packet length data is appended at the head of the packet when it is transferred through the network (the apparatus), so that a buffer exclusive for that packet can be presecured when the first cell of the packet is received. Efficient utilization of the buffer can thus be ensured.

While the first embodiment described above achieves efficient utilization of the buffer, a delay dependent on packet length is inevitable because each packet is sent out on an outgoing virtual connection after it is completely assembled.

A second embodiment of the invention, described hereinafter, improves on this point. In this embodiment, since the transmission of a packet is started after resolving the outgoing connection but before the packet is completely assembled, the delay time does not depend on packet length. However, when a plurality of packets going to the same outgoing virtual connection arrive simultaneously from a plurality of incoming virtual connections, control is performed using a transmission identification number in order to prevent the cells of the respective packets being output from intermingling with one another.

Figure 12:
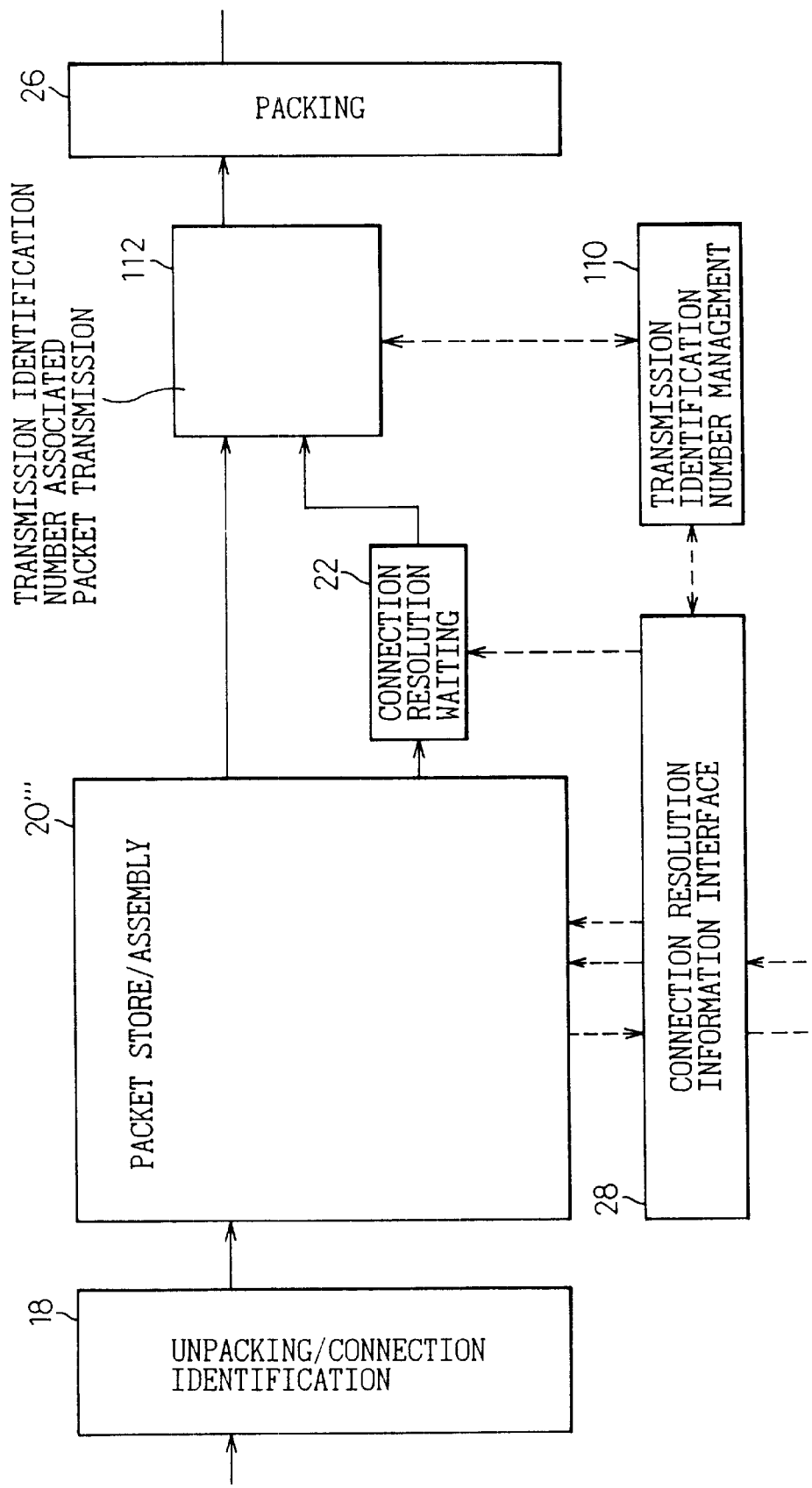
FIG. 12 is a block diagram showing a portion of a data packet switching apparatus according to a second embodiment of the present invention.

FIG. 12 shows the second embodiment of the present invention.

A transmission identification number management circuit 110 assigns a unique unassigned transmission identification number, different from the virtual connection identifier and not used anywhere else, to a packet each time the outgoing ATM virtual connection of the packet is resolved and, after the transmission of the packet is completed, releases the transmission identification number and manages it again as an unassigned transmission identification number.

When the outgoing ATM virtual connection is resolved, the packet store/assembly circuit 20''' transfers the transmission data, together with the outgoing ATM virtual connection and the transmission identification number, to a transmission identification number associated packet transmission circuit 112, even if the assembling of the packet is not completed yet.

The transmission identification number associated packet transmission circuit 112 manages the transfer state for each outgoing ATM virtual connection by using the transmission identification number; more specifically, for packets going to the same outgoing ATM virtual connection, the packets are sent out one packet at a time for each transmission identification number, i.e., a packet having a certain transmission identification number is first transmitted, holding off the transmission of packets having other transmission identification numbers until the transmission of the preceding packet is completed.

Figure 13:
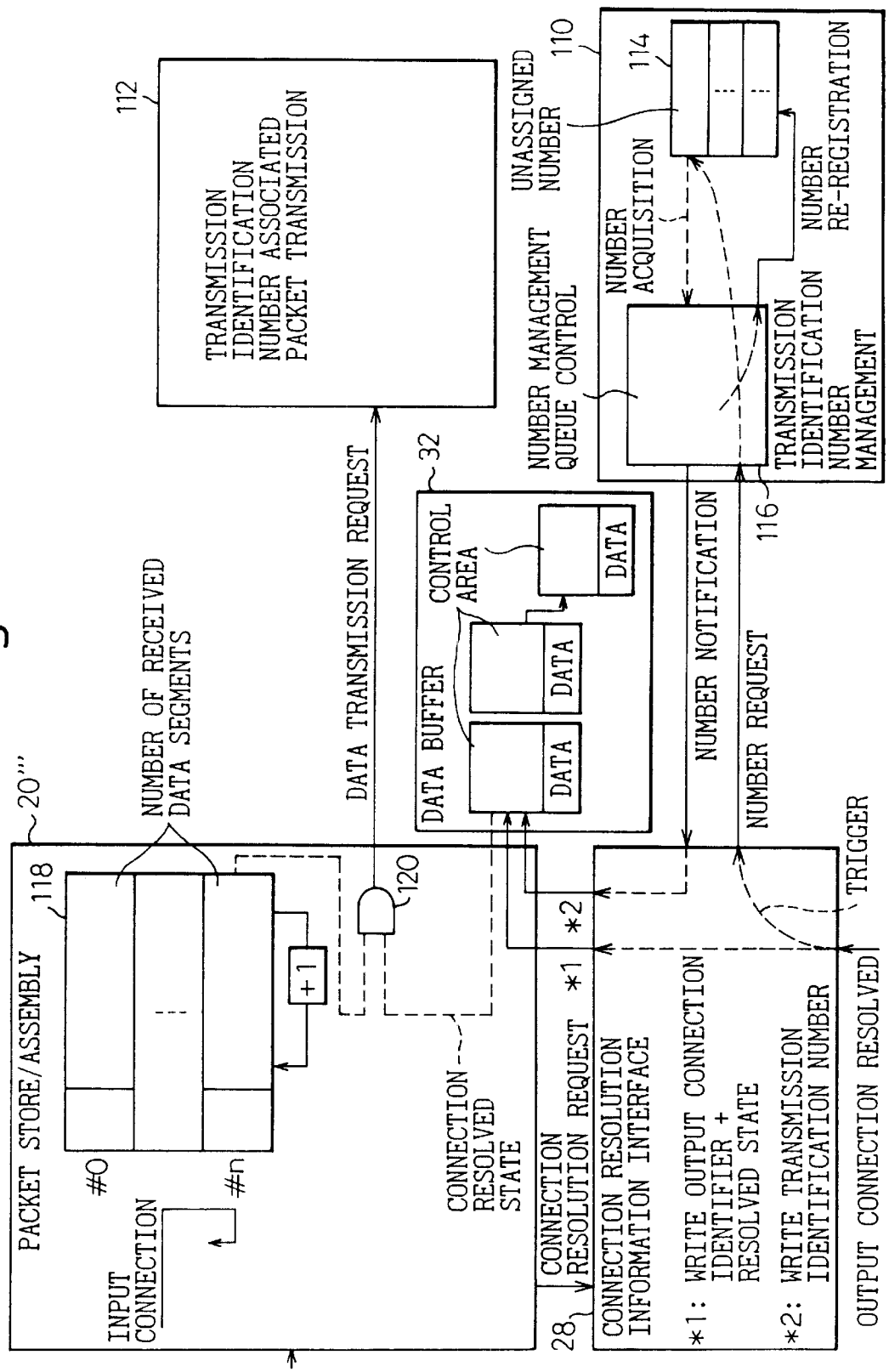
FIG. 13 is a block diagram showing the detailed configuration of a packet store/assembly circuit and a transmission identification number management circuit.

FIG. 13 shows the detailed configuration of the packet store/assembly circuit 20''' and the transmission identification number management circuit 110. The transmission identification number management circuit 110 includes an unassigned transmission identification number management queue 114 and a number management queue control circuit 116.

Figure 14:
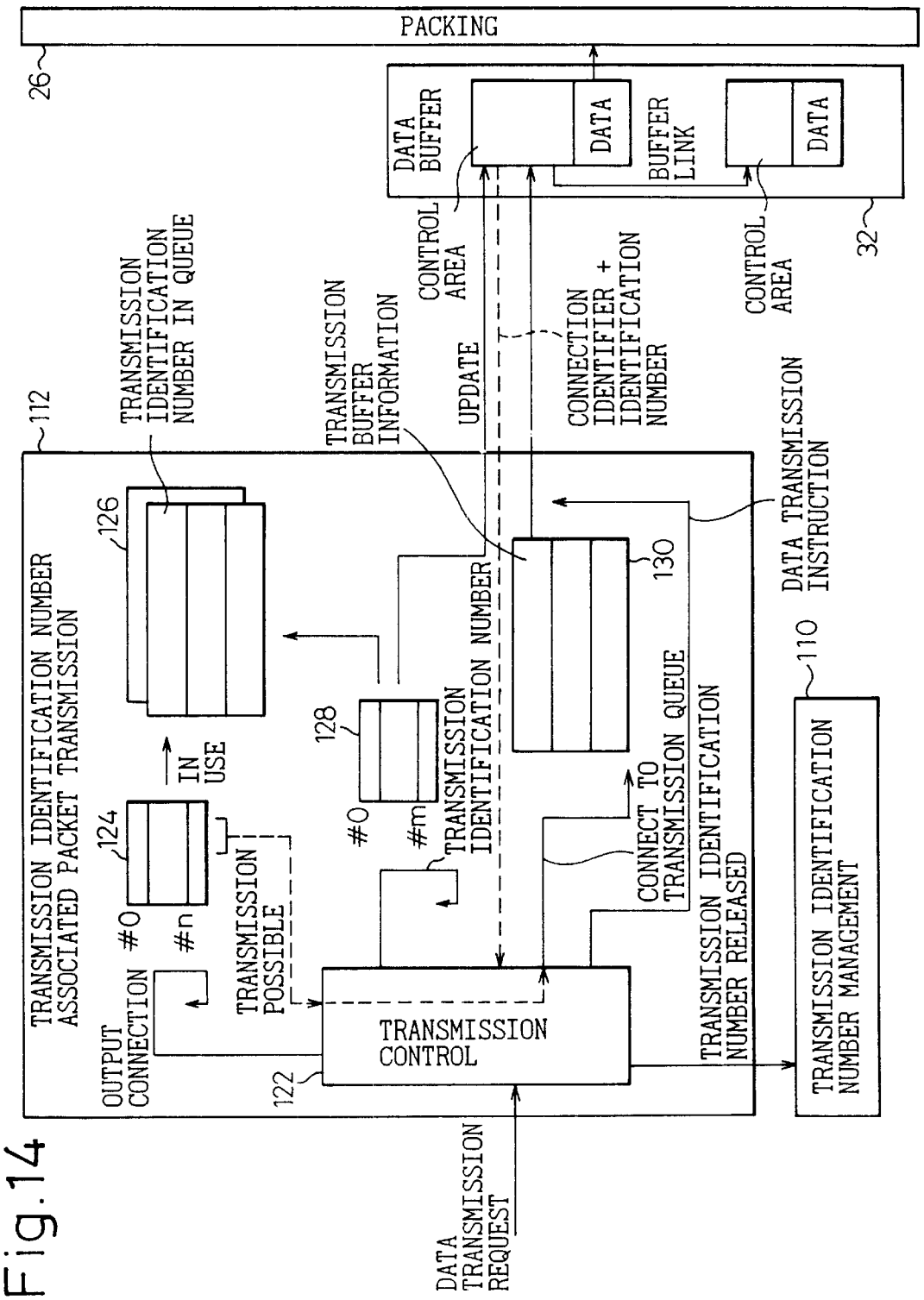
FIG. 14 is a block diagram showing the detailed configuration of a transmission identification number associated packet transmission circuit.

FIG. 14 shows the detailed configuration of the transmission identification number associated packet transmission circuit 112. The transmission identification number associated packet transmission circuit 112 includes a transmission control circuit 122, an outgoing connection state management table 124, an outgoing connection release waiting transmission identification number management queue 126, a transmission identification number associated state management table 128, and a data transmission management queue 130.

In FIG. 13, when cell data is input to the packet store/assembly circuit 20''', the same operation as that in the prior art is performed until the outgoing ATM virtual connection is resolved. When the outgoing ATM virtual connection is resolved, the connection resolution information interface circuit 28 requests the transmission identification number management circuit 110 to transfer an unassigned transmission identification number.

In the transmission identification number management circuit 110, the unassigned transmission identification number management queue control circuit 116 acquires an unassigned transmission identification number from the unassigned transmission identification number management queue 114, and reports the thus acquired transmission identification number to the connection resolution interface information circuit 28. At this time, the acquired transmission identification number is removed from the unassigned transmission identification number management queue 114. By also adding this information, the connection resolution interface information circuit 28 updates the control area of the corresponding data buffer 32 (to change the state to the resolved state).

As first noted, the packet store/assembly circuit 20''' performs the same processing as that in the prior art until the outgoing ATM virtual connection is resolved. The difference, however, is that each time a packet (segment data) is received, a decision is made using an AND circuit 120 as to whether the outgoing ATM virtual connection for that packet has been resolved and whether two or more segments have been stored, by referring to the entry in the packet assembly management table 118 corresponding to the input connection and also referring to the control area of the corresponding data buffer segment. When the two conditions are satisfied, a data transmission request is made to the transmission identification number associated packet transmission circuit 112 by passing data buffer information (pointer information), outgoing ATM virtual connection identifier, transmission identification number, and other information to it, while leaving one buffer segment to indicate the connection of the next data buffer segment.

At this time, the same information (resolved state, transmission identification number, etc.) is copied to the control area of that one remaining buffer segment to ensure that the subsequently input data segments are sent out properly. At the same time, the beginning data buffer pointer in the packet assembly management table 118 is updated to indicate the information of that one remaining buffer segment.

For each subsequently input data segment, the necessary information is passed to the transmission identification number associated packet transmission circuit 112 in the same manner as described above, based on the control area of the one remaining segment, and the contents of the packet assembly management table 118 and the control area of the corresponding data buffer segment are updated accordingly. If the input data segment is the final cell (the final segment of the packet), all information, including the remaining one segment, is passed to the transmission identification number associated packet transmission circuit 112 at the next stage.

When the assembling of the packet is completed (with the reception of the final cell) in the packet store/assembly circuit 20''', if the "resolved state" is not yet indicated in the control area of the corresponding data buffer segment, this means that the outgoing connection is in the process of being resolved; therefore, the data buffer information is sent to the outgoing connection resolution waiting circuit 22 (FIG. 12), as in the prior art configuration. Thereafter, the outgoing connection resolution waiting circuit 22 monitors the control area of the data buffer at periodic intervals and, when the connection is resolved, sends the start pointer information, etc. of the data buffer to the transmission identification number associated packet transmission circuit 112.

In FIG. 14, the transmission control circuit 122 in the transmission identification number associated packet transmission circuit 112 judges the state of the corresponding outgoing connection by referring to the outgoing connection state management table 124 using the received information and, if the outgoing connection is free, it then connects the data segment to the data transmission management queue 130. If the outgoing connection is in use, the transmission control circuit 122 checks the currently used transmission identification number shown in the table and, if the transmission identification number is the same as the reported one, it then connects the data segment to the data transmission management queue 130, as in the above case.

On the other hand, if the outgoing connection is in use and the transmission identification number currently in use is not the same as the reported one, the transmission control circuit 122 checks the state of the reported transmission identification number in the transmission identification number associated state management table 128 and, if it is not yet placed in a queue, it then connects the transmission identification number to the outgoing connection release waiting transmission identification number management queue 126 and registers the information of the data segment in the designated area in the transmission identification number associated state management table 128. If, at this time, the transmission identification number is already placed in a queue, the information of the data segment (including the buffer control area) stored in the designated area within the transmission identification number associated state management table 128 is updated. At this time, if the data segment is the final data (the final segment of the packet), the transmission identification number being used is released to the transmission identification number management circuit 110. At the same time, the outgoing connection state management table 124 is examined, and if there is a queue of other transmission identification numbers waiting for transmission on the same connection, then the transmission identification number for the next transmission is obtained from the outgoing connection release waiting transmission identification number management queue 126, the contents of the outgoing connection state management table 124 and the transmission identification number associated state management table 128 are updated accordingly, and the corresponding data segment is registered in the data transmission management queue 130.

In the transmission identification number management circuit 110, the released transmission identification number is re-registered in the unassigned transmission identification number management queue 114 (FIG. 13) so that it can be reused.

With the above series of operations, if the outgoing ATM virtual connection is available (not used for another data packet transfer), the packet can be transferred without having to wait until the assembling of the packet is completed; this serves to shorten the delay time through the apparatus, compared with the case where each packet is transferred after being assembled.

Furthermore, the data buffer can be utilized more efficiently than the prior art configuration, since packet assembly is not performed.

As described above, according to the present invention, if buffer congestion (buffer full condition) occurs while a plurality of packets are being assembled, since the data buffer is fully used without wastage, the buffer utilization efficiency improves.

Furthermore, since the data delay through the apparatus is dependent only on the time required to resolve the outgoing ATM virtual connection, the delay time can be reduced and can be made predictable.

Moreover, since packet assembly is not performed in the apparatus, the entire data buffer amount can be reduced compared with the prior art (this also enhances the efficient utilization of the buffer).

What is claimed is:

1. A data packet switching apparatus for switching a data packet, arriving from a plurality of incoming virtual connections in a form of logically multiplexed cells, to a predesignated one of a plurality of outgoing virtual connections, said apparatus comprising:

a required buffer amount calculation circuit for calculating a buffer amount required to store said data packet from a packet length contained in cell data of an incoming cell;

a comparator circuit for comparing said required buffer amount with a remaining buffer amount;

a data discard circuit for discarding the cell data belonging to said data packet if, as the result of the comparison, said required buffer amount is larger than said remaining buffer amount;

a data packet assembling circuit for storing cell data in a buffer for each virtual connection, and for assembling said cell data into a data packet;

an outgoing virtual connection resolving section for determining an outgoing virtual connection based on a data packet identifier contained in said cell data; and a packet transmission circuit for transmitting said assembled data packet by appending thereto an identifier of said determined outgoing virtual connection.

2. A data packet switching apparatus according to claim 1, further comprising a delay circuit for delaying said cell data by a time not shorter than the time required for the result of said comparator circuit to be determined, without storing said data in a the buffer.

3. A data packet switching apparatus according to claim 2, further comprising a remaining buffer amount calculation circuit for presecuring the buffer amount required to store said data packet by subtracting said required buffer amount from said remaining buffer amount when it is determined as the result of the comparison by said comparator circuit that said data packet is to be stored in a the buffer.

4. A data packet switching apparatus according to claim 3, further comprising:

a required buffer amount holding table for holding a value representing said presecured required buffer amount for each virtual connection;

a counter table for counting the amount of cell data for each virtual connection as said cell data is actually stored in said buffer;

a second comparator circuit for comparing the amount of cell data actually stored in said buffer with said presecured required buffer amount; and a partially assembled packet discard circuit for discarding the already stored cell data for said virtual connection if the amount of cell data actually stored in said buffer exceeds said presecured required buffer amount.

5. A data packet switching apparatus according to claim 1, further comprising:

a packet length appending circuit for appending packet length to said data packet for a first predesignated virtual connection of said plurality of outgoing virtual connections; and a packet length removing circuit for removing packet length from said data packet for a second predesignated virtual connection of said plurality of outgoing virtual connections.

6. A data packet switching apparatus for switching a data packet, arriving from a plurality of incoming virtual connections in the a form of logically multiplexed cells, to a predesignated one of a plurality of outgoing virtual connections, said apparatus comprising:
- a data packet assembling circuit for storing cell data of incoming cells in a buffer for each virtual connection;
- an outgoing virtual connection resolving section for determining an outgoing virtual connection based on a data packet identifier contained in said cell data;
- a transmission identification number management circuit for appending one unused transmission identification number, selected from among a plurality of different transmission identification numbers, to the cell data belonging to said data packet for which said outgoing virtual connection has been determined, said transmission identification number remaining appended to said cell data until the transmission of said cell data is completed; and
- a packet transmission circuit for transmitting said data packet assembled for each outgoing virtual connection by taking said cell data out of said buffer for transmission based on said determined outgoing virtual connection and said appended transmission identification number.

* * * * *